July 28, 1964     E. V. BUNTING     3,142,316
VALVE MECHANISM

Original Filed Aug. 20, 1954     3 Sheets-Sheet 1

INVENTOR.
ERNEST V. BUNTING
BY
Wolfe, Hubbard, Voit & Osann
ATTORNEYS.

INVENTOR.
ERNEST V. BUNTING
BY
Wolfe, Hubbard, Voit & Osann
ATTORNEYS.

United States Patent Office 3,142,316
Patented July 28, 1964

3,142,316
VALVE MECHANISM
Ernest V. Bunting, Detroit, Mich., assignor to Massey-Ferguson Inc., Detroit, Mich., a corporation of Maryland
Original application Aug. 20, 1954, Ser. No. 451,276, now Patent No. 2,996,124, dated Aug. 15, 1961. Divided and this application Nov. 9, 1960, Ser. No. 68,184
4 Claims. (Cl. 137—625.18)

The invention relates to control valve mechanism for hydraulic systems of the type provided in tractors for raising and lowering attached implements and for regulating their working depths. The present application is a division of my copending application, Serial No. 451,276, filed August 20, 1954, now Patent No. 2,996,124 of August 15, 1961.

One object of the invention is to provide valve mechanism for hydraulic systems of the above general character which affords a wider range, as well as more precise control of the implement raising and lowering power unit.

Another object is to provide a valve construction which minimizes sticking or other malfunctioning of the movable valve member and which materially simplifies the manufacture and assembly of the valves.

It is also an object of the invention to provide valve mechanism that is capable of giving long and efficient service under the severe operating conditions inherent in its use in tractor hydraulic systems.

Other objects and advantages of the invention will become apparent from the following detailed description of the preferred embodiment illustrated in the accompanying drawings, in which FIGURE 1 is a horizontal sectional view through the center housing of a tractor equipped with a hydraulic hitch-actuating power unit and control valve mechanism embodying the features of the invention.

While a single preferred embodiment of the invention has been shown and will be described herein in detail, it is not intended to limit the invention to the particular structure shown, the intention being to cover all modifications and alternative constructions falling within the spirit and scope of the invention as more broadly and generally characterized in the appended claims.

Figure 1:
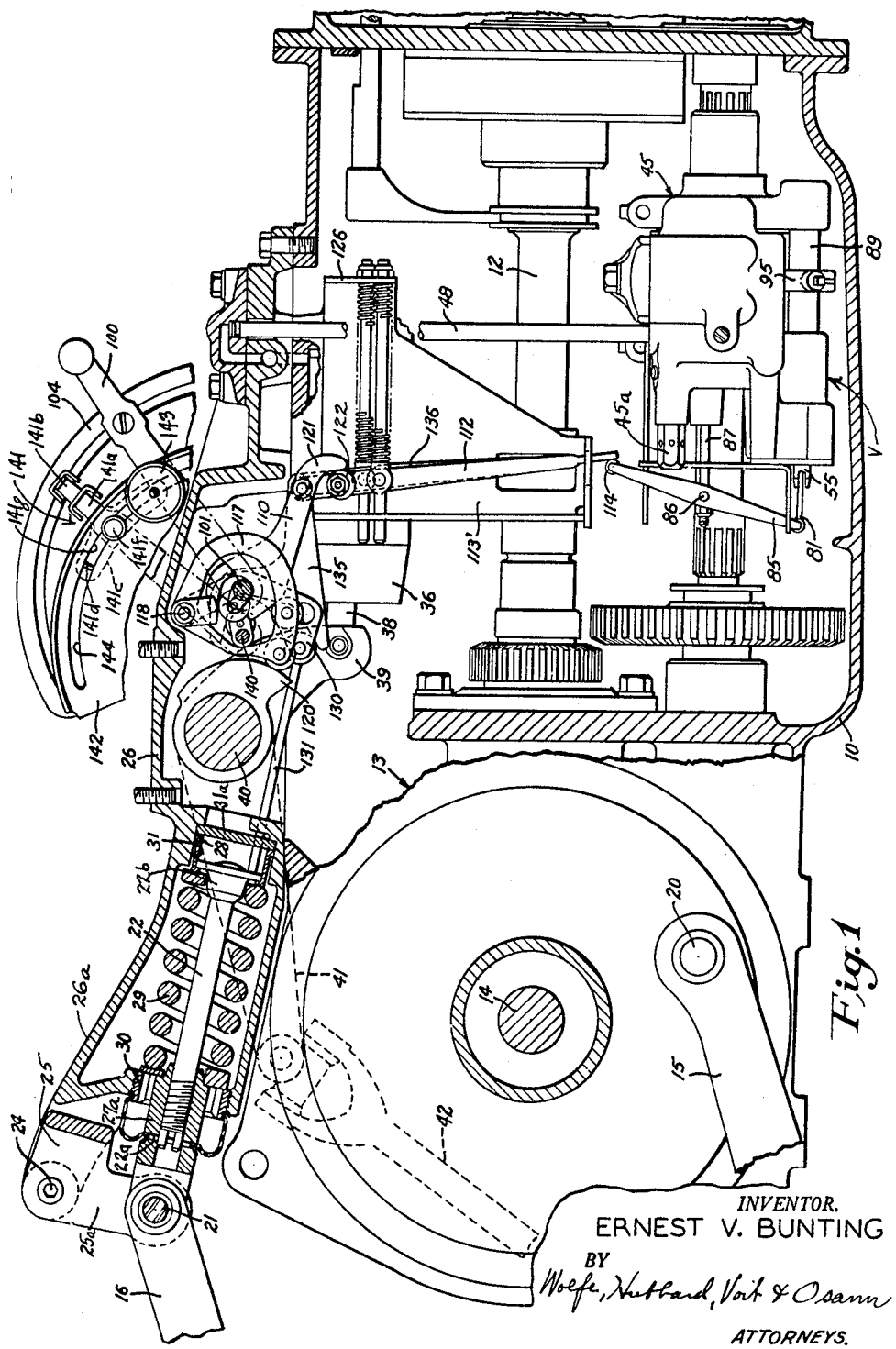

By way of illustration the invention has been shown as incorporated in the hydraulic operating and control system of a "Ferguson" tractor. As shown in FIG. 1, the tractor has a center housing 10, which, with the engine and central gear box, constitute the backbone of a frameless tractor body. Such tractors are conventionally equipped with pneumatically tired wheels, the rear or driving wheels of which are driven from the tractor engine through change speed gearing (not shown) by way of a power delivery shaft 12, a differential 13 and axle shafts 14.

The exemplary tractor is equipped with an implement hitch linkage of the type commonly provided on "Ferguson" tractors. This linkage includes a pair of trailing lower or draft links 15 and an upper or top link 16. The draft links 15 are pivoted at their forward ends as at 20 on the rear portion of the tractor center housing to swing both vertically and horizontally. At their trailing ends the draft links are provided with suitable connecting elements for disengageable connection with ground working or other types of implements that are to be coupled to the tractor.

In use, the top link 16 of the hitch linkage has its trailing end connected with the implement at a point substantially above the draft link connections so that the forward tilting of the implement due to soil reaction on its ground engaging parts is transmitted to a spring biased control plunger 22 on the tractor. As herein shown the plunger 22 is supported for axial movement in an extension 26a of the center housing cover plate 26 with one end projecting at the rear of the housing. The projecting plunger end is connected by a coupling pin 21 with the top link 16 and with a rocker 25 which, in turn, is pivoted as at 24 on the cover plate extension.

Biasing of the plunger is effected by a heavy coil spring 29 interposed between spaced abutments on the plunger presented in this instance by a head 27a threaded on the plunger and a cup-shaped member 28 with which the plunger has a lost motion connection. The extension 26a also presents stationary abutments or stops for cooperation with the spring, one of the abutments comprising a collar 30 threaded into the extension and encircling the head 27a. The other stop comprises a closure plate 31a bearing against a shoulder on the housing and providing a seat for the member 28.

In the above arrangement the spring 29 is double acting. Thus, when tension is applied to the top link 16, plunger 22 and member 28 are drawn rearwardly, compressing the spring between the member 28 and the collar 30. Conversely, when compression is applied to the top link, the plunger 22 is shifted forwardly and the spring 29 is compressed between the head 27a and the member 28 when the latter bottoms on the closure plate 31a. Such movements of the plunger 22 are transmitted through a push rod 131 to the control mechanism for effecting the raising or lowering of the hitch to adjust the draft load on the hitch linkage as will appear presently.

Raising and lowering of the hitch linkage is effected by a hydraulic power unit. As shown in FIG. 1, the unit comprises a cylinder 36 secured to the underside of the center housing cover plate. The cylinder, which opens to the rear, is fitted with a working piston having its piston rod 38 projecting rearwardly therefrom. The ball-shaped outer end of the piston rod is socketed in the end of an arm 39 rigid with a transverse rock shaft 40 journaled in the upper rear portion of the tractor body. The ends of this rock shaft project at opposite sides of the center housing and each has a crank arm 41 splined thereon. The crank arms are connected to the respective draft links 15 by drop links 42.

The relationship between the power unit and the hitch linkage is such that when pressure fluid (such as oil) is supplied to the closed end of the cylinder 36, the piston is forced rearwardly to rock the arms upwardly and thus raise the lower draft links 15 and the implement coupled thereto. Similarly, upon exhaust of fluid from the cylinder 36 the piston is permitted to retreat into the cylinder under the urging of the gravity load on the links 15 so that the links swing downwardly in a lowering direction.

The volumetric rate at which oil is supplied to or exhausted from the ram cylinder 36 will accordingly determine the rate at which the draft links 15 are raised or lowered. In the exemplary tractor, pressure fluid is supplied to the power unit from a positive displacement pump 45 under control of a novel valve mechanism V. As shown in FIG. 1, the pump 45 is located in the center housing below the cylinder 36. The lower portion of the housing is flooded with oil constituting a sump for the system. Oil enters the pump through an intake passage 47 (FIG. 2) controlled by the valve V and is discharged from the pump through a conduit 48 leading to the closed end of the cylinder 36. Oil is exhausted from the cylinder 36 through the conduit 48 and an exhaust passage 49, also controlled by the valve V. A spring loaded safety valve 45a relieves the high pressure side of the pump when excessive pressure is reached.

Figure 2:
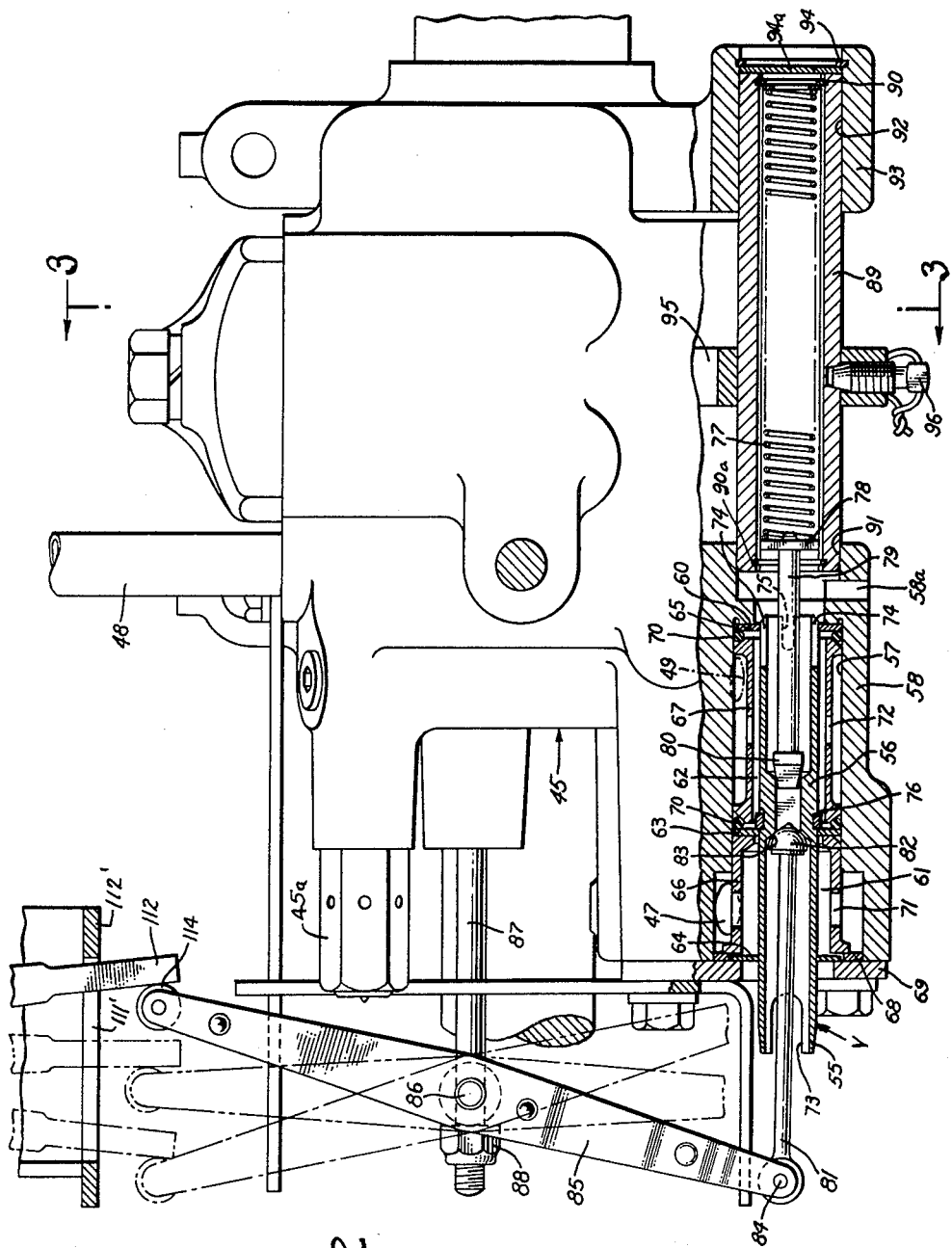
FIG. 2 is a longitudinal sectional view of the control valve mechanism.
Figure 3:
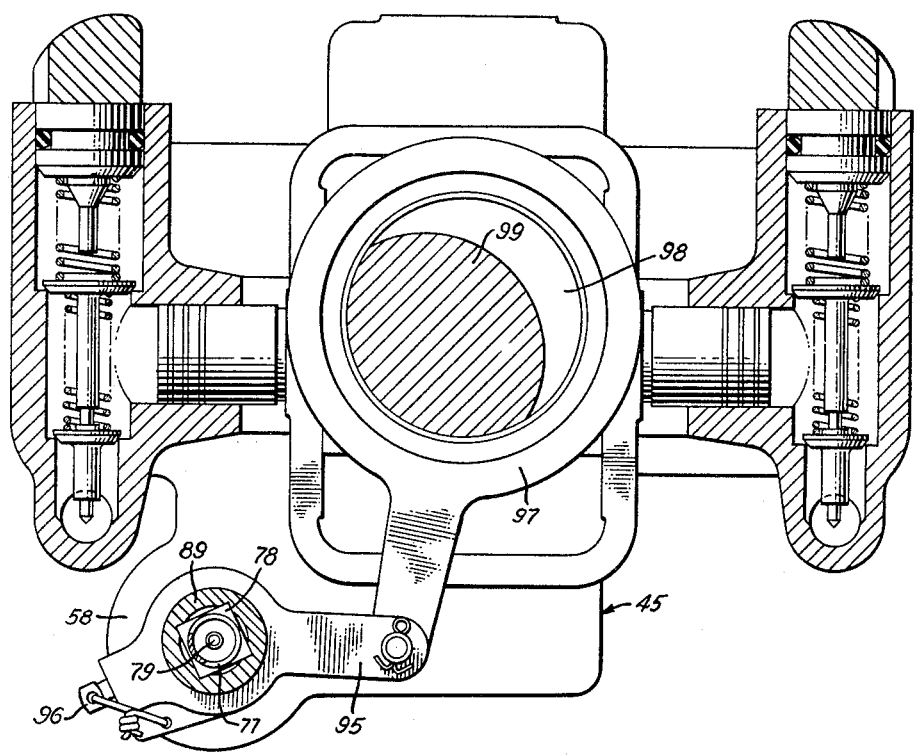
FIG. 3 is a fragmentary sectional view taken in a plane substantially on the line 3—3 of FIG. 2.

As will be seen by reference to FIG. 2 of the drawings, the valve V is located in the lower portion of the pump housing. Its function is to meter fluid into or out of the system or to block it altogether. In accordance with the invention, novel features of construction have been incorporated in the valve mechanism to effectively avoid any binding or sticking of the parts so that high fidelity operation will be insured even under the most trying field conditions.

In its preferred form the valve V comprises an axially slidable plunger 55. It is generally tubular in shape with an interior central enlargement or partition 56 through which extends an axial opening of square cross section. The plunger may be machined from bar stock and suitably hardened, being made to very accurate dimensions. In the assembled valve the plunger is slidably received in a pair of hardened accurately fitted steel rings 63 and 65 which define opposite ends of a high pressure chamber 62. A third ring 64 coacts with the central ring 63 to define the opposite ends of a second or low pressure intake chamber 61. This third ring 64 is, however, free to float transaxially within the confines of an outer ring 68. The nose of the plunger 55 adjacent the floating ring 64 is tapered so that it can enter the ring freely as it passes in and out of the chamber 61, centering the ring as it does so. Accordingly, accurate concentricity of mounting is required for only a pair of rings (63, 65) rather than for a set of three, which would be a far more difficult task.

By using rings as shown to constitute the lands at opposite ends of chambers through which the plunger 55 passes, liability to sticking and malfunction of the plunger are minimized. The contact areas of the rings with the plunger being of short axial length, they can be formed with greater accuracy (to tolerances of a few thousandths of an inch) and less liable to ovaling or other faults than would be the case with a bushing bored to receive the plunger.

Spacing sleeves 66 and 67 are interposed between the rings 64, 63 and 63, 65, respectively. Being completely out of contact with the plunger 55 their interior bores need not be of any great accuracy either as to size or straightness. The sleeve 66 has large ports 71 for free passage of oil from the chamber 61 into the annular space surrounding the sleeve and thence into the pump intake passage 47. Likewise, the other sleeve 67 has large ports 72 for unrestricted flow of oil into high pressure chamber 62 from the discharge passage 49. The latter is cored in the pump housing and communicates with the conduit 48.

The rings 63, 64 and 65 with their interposed spacer sleeves 66 and 67, are assembled in stacked relation as shown in FIG. 2 within a suitable bore 57 in a boss 58 integral with the pump housing and are held in place therein by a cover plate 69 bolted to the housing. Sealing at the ends of the high pressure chamber 62 is insured by elastic O-rings 70 interposed between the flanged ends of the sleeve 67 and the adjacent faces of the steel rings 63, 65. The whole assembly is pressed by the cover plate 69 against a shoulder 60 at the inner end of the housing bore.

In its central or neutral position, imperforate surface portions of the plunger 55 bridge between the rings 63, 65 and 63, 64. Consequently, entry of oil into the intake chamber 61 and exit of oil from the high pressure chamber 62 are both prevented. Under such conditions, fluid is locked in the system and the ram piston remains stationary to hold the hitch linkage in a fixed position.

As the valve plunger 55 is moved axially rearward or to the left as shown in FIG. 2 from such neutral position, there is a progressive uncovering of a pair of narrow, axially extending slots 74. As these slots pass under the ring 65, greater and greater slot area is opened to the high pressure chamber 62. Accordingly, as soon as these slots or "drop" ports begin to open in that fashion, high pressure oil spurts through them from the pressure chamber 62, passes into the interior of the plunger, and then through a passage 58a back into the sump. Such bleeding of fluid from the system permits the ram cylinder to retract into the cylinder 36, lowering the hitch links 15.

The rate of such lowering depends upon the rate at which oil can escape to the sump. By using slots 74 of long thin shape as shown for such "drop" or escape ports, the rate can be controlled with great nicety in sliding the plunger back and forth to vary the area of the slots exposed. A second pair of slots 75 shorter and wider than the slots 74 are also provided in the "drop" end of the plunger 55. When the plunger has moved far enough rearward so that these slots 75 also begin to be exposed, the rate of oil escape abruptly increases. A fast dumping of the system ensues.

Abutment against the central ring 63 by the shouldered left end of a stop collar 76 (seated in a groove girdling the central portion of the plunger) limits the rearward travel of the plunger. That limit position is one in which the plunger is still guidingly received in the accurately fitted ring 65. The stop collar 76 likewise abuts against the ring 65 to limit travel of the plunger in the opposite or forward direction. In that limit position (see FIG. 4), however, the plunger has left the ring 64 but can readily reenter it because that ring is freely floating.

As the plunger 55 moves forward from its neutral position, high pressure chamber 62 remains closed. But a pair of large slots 73 in the end of the plunger pass under the ring 64, establishing intake for the pump. As these slots 73 are so uncovered, oil passes (from the surrounding body of oil in the sump in which the mechanism is immersed) through the slots into the chamber 61 through the large ports 71 and thence into the intake passage 47. Oil so taken in is delivered by the pump to the ram cylinder 36 raising the hitch links 15. The functioning of the valve for overload release purposes in which the plunger 55 travels to its extreme forward position will be described later.

As herein shown the plunger 55 is yieldably urged towards its rearward or "drop" position by a compression spring 77 acting between a fixed abutment and a head 78 on the inner end of a push rod 79 operatively connected with the plunger. The operative connection in this instance is provided by a head 80 of truncated shape, mating with a passage of square cross section in the central partition 56 of the plunger.

For shifting the plunger against the bias of the spring 77 there is provided a push rod 81 having a semispherical head 82 engaging in a conical socket 83 at the other end of the partition 56 of the plunger. At its outer end the push rod 81 is pivotally connected by a pin 84 to the lower end of a valve lever 85 by which an operating connection is made to the control mechanism later described. The lever 85 is pivoted intermediate its ends as at 86 on a supporting member 87 herein shown as a rod projecting from the pump housing. A nut 88 threaded on the rod affords adjustment of the pivot fore-and-aft relative to the axis of the valve.

Provision is made for continuously oscillating the valve plunger 55 about its longitudinal axis to insure smooth and easy sliding of the plunger at all times. For this purpose the biasing spring 77 is housed in a cylinder 89 within which is received the square head 78 on the push rod 79. Four grooves in the cylinder receive the corners of the head so that it can slide freely lengthwise of the cylinder but is nevertheless constrained to rock or oscillate about the cylinder axis. Restricted clearance is also thus afforded between the edges of the head 78 and the cylinder through which oil can flow to give a dashpot effect for the plunger and thus damp movement of the valve plunger. The head 80 of the push rod provides a rotary driving connection whereby the valve plunger 55 is oscillated with the push rod upon oscillation of the cylinder. A snap ring 90 within the cylinder defines a fixed abutment for the spring 77. A second snap ring 90a at the opposite end of the cylinder catches the corners of the square head 73, holding it from emerging from the cylinder during assembly of the parts.

Figure 4:
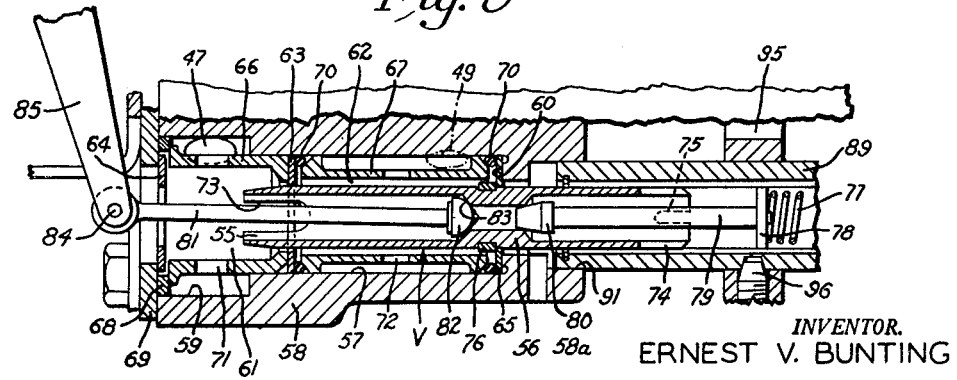
FIG. 4 is a stop motion view of the valve mechanism in the overload release position.

As shown in FIGS. 2 and 4, the cylinder 89 is rotatably supported at one end in a recess 91 in the valve casing concentric with the valve bore 57. At its other end the cylinder is likewise rotatably supported in a recess 92 in a boss 93 which may constitute a part of the pump housing or a part of a bracket rigidly attached to the housing. A snap ring 94 in the recess 92 takes the reaction of the cylinder 89. Interposed between the snap ring and the end of the cylinder is a disc 94a. The latter closes the cylinder end so that it may function as a dashpot as mentioned above.

The cylinder and parts connected thereto are oscillated in timed relation to the rotation of the pump shaft by means of an arm 95 having an enlarged end portion apertured to receive the cylinder 89 and non-rotatably secured thereto by suitable means such as a locking screw 96. At its other end the arm 95 is pivotally connected with a connecting rod 97 which has a ring portion encircling one of the eccentrics 98 on the pump shaft 99. As the pump shaft rotates the eccentric acts through the connecting rod to oscillate the rod 95 and cylinder 89 and such oscillations are transmitted by the push rod 79 to the valve plunger 55.

Two types or sources of control are present in the exemplary hydraulic system for operating the valve V, one manual and the other automatic. So far as automatic control is concerned, soil reaction on the implement is measured by the control spring 29 through the force applied through the top link 16 of the hitch. As indicated above, changes in the forces on the top link are reflected in the axial movements of the push rod 131 which acts to shift the valve V, as will appear presently. Likewise, vertical positioning of the hitch linkage is automatically measured by the rotational position of an edge cam 120 fast on the rock shaft 40 and therefore always positioned in agreement with the draft links. Cam 120 is also utilized in operating the control valve V.

So far as concerns manual adjustment or control, the driver uses a main quadrant lever 100 fixed on the outer end of a shaft 101 journaled in the housing cover plate. A slotted sheet metal quadrant 104 serves as a guide for the lever.

Alongside the main quadrant is a second or auxiliary quadrant 142 slotted as at 144. Riding on this second quadrant is what may be called a "draft setter" designated generally as 141. This draft setter has two sheet metal handles or fingerpieces 141a and 141b. The first fingerpiece is integral with a slide 141c of T-shape having a pair of spaced tangs 141d guidingly received in the slot 144. A bolt having a squared shoulder engaging in a complemental recess in the slide extends through slot 144 for cooperation with a knurled knob or nut 143 which releasably secures the slide 141c in selected positions of adjustment. The other fingerpiece 141b is fastened on the end of a lever non-rotatably fixed to the outer end of a shaft 140. A bolt 141f passing through the slot 144, a complemental slot 141g in the slide 141c and an aperture in the lever is operative to frictionally clamp the lever in adjusted positions.

To use the draft setter the driver loosens the knob 143, grasps the pair of fingerpieces 141a and 141b and then slides them downwardly to a position corresponding to the working depth (actually the draft load) which he requires for the implement. Then he retightens the knob 143. Should he wish to make some short time field adjustment, he grasps the fingerpiece 141b alone, pushing it up or down as required. Then to restore the original setting he has only to squeeze the fingerpieces together, bringing the fingerpiece 141b back into registry with 141a.

The draft setter 141 is in general left at the working depth found best for the particular implement being used. The driver pulls up or lowers the main quadrant lever 100 to raise or lower the implement. Once in the soil the system will automatically retain the draft load fixed by the draft setter 141. Occasions for changing the setting of the latter are, of course, comparatively infrequent.

In considering the mechanism here illustrated for funtionally connecting the valve mechanism V with the various manual and automatic sources of control, it will be expedient first to trace the mechanical connections from the quadrant lever 100 and position cam 120 by which the basic follow-up or position control action between the quadrant lever and the hitch linkages is effectuated. As above stated, the quadrant lever is mounted on the quadrant lever shaft 101 which has an eccentric portion journaling a roller positioned between a pair of jaws formed on the end of a cam lever 110 which is pivotally connected to the upper end of an intermediate valve actuating lever 112. The downturned forward end 121 of the lever 110 is hooked over an eccentric secured in selected position on the lever 112. Lever 112 is pivotally supported on a normally stationary pivot with its lower end positioned in the path of a roller 114 mounted on the upper end of a valve lever 85. Lever 112 has its lower end guided in a slot 111' formed in a horizontally disposed flange 112' of a bracket 113'. The action of the valve biasing spring 77 in urging the valve plunger 55 in a direction to swing the lever 85 clockwise (as viewed in FIG. 2) tends to rock the lever 112 counterclockwise and thus imposes a bias on the lever 112.

The edge of the lower jaw of the cam lever 110 is formed to present a sloping cam surface adapted to ride on a follower roller carried by a rocker 117. The rocker is mounted to swing on a pivot shaft 118 supported on and extending across the upper part of the housing cover plate. A second follower on the rocker 117 spaced rearwardly from the first mentioned roller coacts with the position control cam 120 on the rock shaft 40. The cam is so shaped that it swings the rocker forwardly as the hitch links are lowered and permits the rocker to swing rearwardly as the links are raised.

With the above arrangement of the control elements, movement of the control lever 100 of its uppermost position swings the cam lever 110 in a counterclockwise direction, assuming that the hitch links are in a lowered position. The cam 120 will then be holding the rocker 117 forwardly and the follower roller thereon will shift the cam lever 110 forwardly. This rocks the lever 112 clockwise and the lever 85 counterclockwise to shift the valve plunger 55 to "raise" position. The power operating system accordingly responds to raise the hitch.

As the hitch links rise, the cam 120 turns in unison so that the rocker 117 and cam lever 110 move rearwardly under the urging of the valve spring 77. Accordingly, the valve plunger is progressively shifted towards and to its neutral position by the spring. In this instance the valve arrives at neutral as the hitch reaches transport position.

To lower the hitch the lever 100 is swung forwardly and downwardly or toward the position shown in FIG. 1. This raises the rear end of the cam lever 110 and allows the cam lever to move rearwardly. Such rearward movement of the cam lever and consequent rocking of the levers 112 and 85 permits the valve plunger 55 to shift toward the "drop" position. The control valve opens to exhaust fluid from the ram, thus permitting the hitch linkage to descend.

As the hitch descends the cam 120 progressively shifts the cam lever and associated elements including the valve plunger 55 toward the neutral position so as to interrupt the exhaust of fluid from the ram when the hitch reaches the position corresponding to the position to which the control lever 100 has been moved. Full lowering is accomplished when the lever is advanced to the position shown in FIG. 1. It will thus be seen that the hitch may be raised or lowered by swinging the control lever 100 through the upper portion of its range. The hitch linkage follows precisely the movements of the control lever and comes to rest in a position corresponding to that in which the lever is stopped. Moreover, the movements of the hitch linkage approximates the movements of the lever as to rate so that the driver can raise or lower the hitch linkage rapidly or slowly if desired and can, of course, stop the movement in any desired position.

The position control action above described is that which would occur with the draft setter 141 set so low or for such a heavy draft load that it is not reached during the actual working contemplated. When, however, the draft setter is moved to a position representing a draft load which will be and is encountered as the implement penetrates the soil, the operations are modified in the following manner. Push rod 131, previously mentioned, is pivotally connected to a rocker 130 pivotally supported on the shaft 118. Inward movement of the push rod 131 under the influence of the draft load on the hitch therefore swings the rocker forwardly. Rocker 130 carries a follower roller adapted to ride over a wedge or sloping cam surface on a cam lever 135. This cam lever is pivotally connected at its forward end to a lever 136 which in turn is pivoted intermediate its ends on a normally stationary pivot closely adjacent the pivot for the lever 112. The lever 136 is arranged alongside the lever 112 with its lower end guided in the slot 111' in the bracket flange and extending through it for cooperation with the roller 114 on the valve actuating lever 85. The spring bias on the lever 85 (from the spring 77) urges the lever 136 counterclockwise and thus biases the cam lever 135 rearwardly.

To provide for selectively determining the draft load to be maintained on the hitch, the cam lever 135 has a rearwardly extending finger portion defining a cam surface cooperating with a roller carried by an eccentric on the shaft 140 upon which the draft setter 141 is mounted. Rocking of the shaft 140 by the depth setter is thus effective to vary the position of the cam surface of the cam lever with reference to the cooperating roller. Accordingly, the position at which the lever 136 intercepts the valve lever 85 may be varied by using the depth setter to swing the cam lever 135 on its pivot. This adjustment determines the inward displaced position of the control rod 131 required to return the plunger 55 to neutral position or, in other words, the draft load to be maintained on the hitch linkage.

Differences in implements require variations in the response characteristics of the system in order to realize satisfactory operation for all. For example, if the system is sensitive enough to respond adequately for a light cultivator, it will overcontrol so badly for a big three-bottom plow as to cause erratic and poor performance. Conversely, if the system is calculated for the heavy implement a light one is substantially impotent to bring about any kind of control action. Heavy implements of light draft and vice versa extend the problem. The problem also becomes more acute as tractor power is increased, for with larger tractors, an increasingly wide range of implement sizes can or rather should be accommodated.

Those problems have been solved in the present system by a basically new approach. In substance, what is done is to interpose a positive stop for adjustably limiting the movement of the valve mechanism in the "drop" direction. Stated more fully, what is done is to provide first of all a control valve mechanism which dumps oil at a variable rate depending upon the extent of motion imparted to a movable member of the mechanism.

Referring more particularly to FIG. 2 of the drawings, the travel of the plunger 55 is adjustably limited in a leftward or "drop" direction. For a heavy three-bottom plow, for example, the limit is set so that, at most, only a portion of the narrow slot 74 can be uncovered when the draft controls call for a corrective lowering of the implement. Accordingly, even though the implement is very heavy and the oil thus expelled under high unit pressure, it will not overcontrol, will not dig too deep before the corrective lowering can be arrested. With a lighter implement the limiter is set to permit greater travel of the plunger 55 so that more of the length of the slot 74 can be uncovered. Indeed, if desired, some of the slot 75 can also be uncovered. Consequently, even though the lighter implement does impose a lesser pressure on the oil in the system (and hence will not cause oil to be expelled during "drop" at the same rate as would a heavy implement), enlargement of the available drop port area compensates.

The volumetric rate at which oil can be discharged for drop can thus be made substantially the same for all implements regardless of the weight and suck which they may impose on the tractor. In the exemplary mechanism the auxiliary valve lever 112 is utilized to provide the limit stop for the valve lever under conditions in which it has been freed from its position control functions. Variable setting of the auxiliary lever is effected by movements of the main quadrant lever 100 beyond the limit position shown in FIG. 1. Thus, when the quadrant lever is pushed down from the illustrated position, it will lift the cam lever 110 to interrupt its coupling with the position control cam 120. Such lifting of the cam lever also brings its hooklike element 121 into engagement with an adjustable eccentric 122 (FIG. 1) on the lever 112 as the cam lever swings beyond its lower position control limit. Cam lever 110 and the lever 112 then rock as a unit about the pivot of the latter during any further subsequent downward movement of the lever 100. Thus, further downward movement of the lever 100 swings the lower end of the lever 112 rearwardly as indicated by the several broken line positions in which the lever is shown in FIG. 2. The lever 112 then serves as a stop or abutment to progressively restrict the movement of the valve plunger 55 toward exhaust position. Maximum restriction of the exhaust through the control valve is accordingly obtained when the lever 100 is moved to its extreme lowered position, thereby restricting movement of the valve plunger to a position in which only a small portion of the valve slot 74 is exposed to the pressure chamber of the valve. Minimum restriction of exhaust is available when the cam lever hook first contacts the lever 112 (as in FIG. 1) for in that adjustment the valve plunger 55 can be actuated to its full exhaust position.

The improved valve mechanism is also operable to abruptly relieve pressure in the system when a sudden overload is imposed on the tractor as by the implement hitting a rock or other fixed obstruction. By so relieving the pressure, the implement which has been "carried" on the column of oil in the cylinder 36 is dropped and consequently the weight carried on the tractor drive wheels is dropped. The sudden drop in carried weight permits the tractor drive wheels to spin and the momentum of the equipment is dissipated without further tugging and straining at the obstruction.

When the obstruction is hit the sudden increase in draft generates a force which is transmitted through the plunger 22 and control rod 131 to control mechanism to shift the valve plunger 55 to the extreme rightward position in which it is shown in FIG. 4. It will be observed that in such position the wide slots 73 which normally serve as intake slots are moved beyond the central ring 63 into the high pressure chamber 62. Accordingly, in such position of the valve plunger pressure in the system is relieved through the slots 73 to the sump. Not only is the pump output diverted to the sump but the fluid in the cylinder 36 is quickly dumped to drop the hitch linkage and reduce the load on the tractor drive wheels.

It will be apparent from the foregoing that the invention provides valve mechanism of a novel and advantageous character for hydraulic systems of the type employed in tractors. The valve mechanism provides a wide range of control and is accurate and precise in its operation. Through the novel construction and relation of the movable and fixed members of the valve, sticking or other malfunctioning of the movable valve member is effectively avoided. Moreover, manufacture and assembly of the valve mechanism is greatly simplified. The valve mechanism is simple and rugged in construction and capable of giving long and efficient service under the severe operating conditions inherent in its use in a tractor hydraulic system.

I claim as my invention:

1. A valve comprising a housing having an elongated cylindrical bore divided into two axially aligned chambers, a tubular valve member slidable axially through said bore, said member having slots at opposite ends spaced apart sufficiently to enable the non-slotted portions of the member to close the outer ends of both chambers by effecting a seal with the outer ends of said cylindrical bore when the member is located in a central position, stop means on said valve member coacting with stop means in the valve bore to define the limit positions of the member at either side of said central position, said member in one of its limit positions exposing the slots in one of its ends to one of said chambers to open the outer end of said chamber while maintaining the outer end of the other chamber closed, and said valve member in the other of said limit positions exposing the slots in its other end to both of said chambers to open the outer end of said other chamber and to interconnect both chambers at their inner ends.

2. A valve comprising a housing having an elongated cylindrical bore, three thin metal rings disposed in said bore and axially spaced apart to define lands dividing the bore into two valve chambers, a tubular valve plunger slidable axially through said rings in engagement with said lands, said valve plunger having slots at opposite ends spaced apart sufficiently to enable the non-slotted portions of the plunger to effect a seal with all three of said rings when in a central position, stop means on said valve plunger coacting with stop means in the valve bore to define the limit positions of the plunger at either side of said central position, said valve plunger in one of said limit positions positioning the slots in one of its ends so as to span one of the end rings to disrupt the seal therewith while maintaining the seal at the other two rings, and said valve plunger in the other of said limit positions positioning the slots in its other end so as to span the central one of said rings to disrupt both the seal therewith and with the other outer ring while maintaining the seal at said one outer ring.

3. In a control valve, the combination of a housing, a pair of axially aligned, rigid rings having accurately formed internal bores disposed in said housing to define opposite ends of a high pressure chamber, a third rigid ring having an accurately formed internal bore supported in said housing in substantial axial alinement with said pair for limited trans-axial floating movement and located to coact with one of the first mentioned pair of rings to define the opposite ends of a low pressure chamber, and a plunger closely fitted in said bores and slidable axially through said rings.

4. A valve comprising, in combination, a casing having a cylindrical bore, a valve assembly in said bore including an elongated plunger, three rigid ring members apertured to receive said plunger with a sealing fit, means interposed between said rings to retain them spaced apart axially of said plunger, said plunger, said rings and said spacing means being assembled for insertion in said bore as a unit, two of said rings being dimensioned for closely fitting engagement with the walls of the bore, the other of said rings being dimensioned to fit loosely in said bore whereby alinement of the assembly in the bore is facilitated, and means for retaining the assembly in said bore.

References Cited in the file of this patent

UNITED STATES PATENTS

| | | |
|---|---|---|
| 1,385,019 | Mathieu | July 19, 1921 |
| 2,118,180 | Ferguson | May 24, 1938 |
| 2,212,343 | Goehring | Aug. 20, 1940 |
| 2,320,905 | Bateholts | June 1, 1943 |
| 2,485,504 | Morgan | Oct. 18, 1949 |
| 2,506,111 | Saint | May 2, 1950 |
| 2,638,045 | Heitshu | May 12, 1953 |
| 2,799,251 | Newgen | July 16, 1957 |